INVENTOR.
William R MacLean
BY
ATTORNEY

Dec. 6, 1949 W. R. MacLEAN 2,490,377
SYSTEM FOR DETERMINING THE POINT OF BREAK
IN AN ELECTRICAL CONDUCTOR
Filed Dec. 16, 1944 3 Sheets-Sheet 3

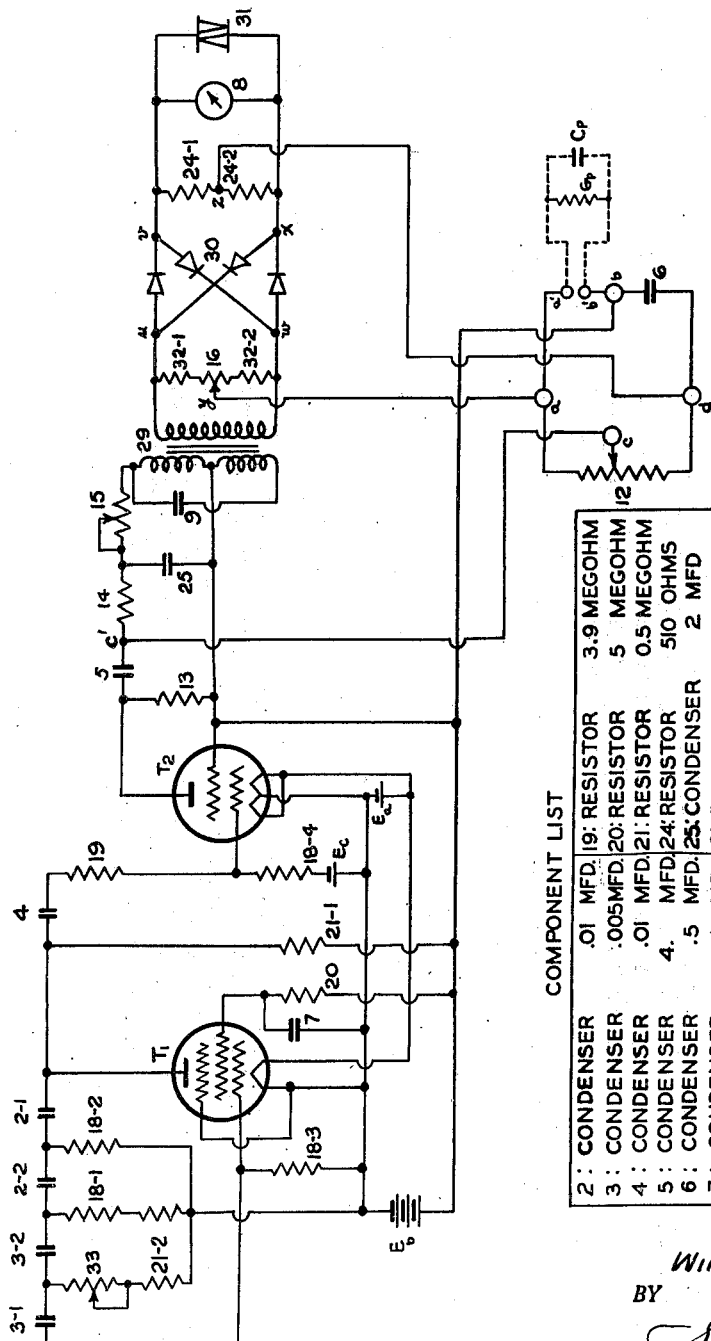

FIG. 8

COMPONENT LIST

| | | |
|---|---|---|
| 2: CONDENSER | .01 MFD. | 19: RESISTOR 3.9 MEGOHM |
| 3: CONDENSER | .005 MFD. | 20: RESISTOR 5 MEGOHM |
| 4: CONDENSER | .01 MFD. | 21: RESISTOR 0.5 MEGOHM |
| 5: CONDENSER | 4. MFD. | 24: RESISTOR 510 OHMS |
| 6: CONDENSER | .5 MFD. | 25: CONDENSER 2 MFD |
| 7: CONDENSER | .1 MFD. | 29: TRANSFORMER |
| 8: GALVANOMETER. | | 30: RING MODULATOR |
| 9: CONDENSER | 1. MFD. | 31: VARISTOR |
| 12: SLIDE WIRE | 550 OHMS | 32: RESISTOR 400 OHMS |
| 13: RESISTOR | 3000 OHMS | 33: POTENTIOMETER |
| 14: RESISTOR | 7500 OHMS | T₁: TUBE TYPE 1LN5 |
| 15: POTENTIOMETER | 10,000 OHMS | T₂: TUBE TYPE 3Q5-GT |
| 16: POTENTIOMETER | 200 OHMS | E_a: BATTERY 1.5 VOLTS |
| 18: RESISTOR | 1 MEGOHM | E_b: BATTERY 90 VOLTS |
| | | E_c: BATTERY 4.5 VOLTS |

INVENTOR.
William R MacLean
BY
Samuel Ostrolenk
ATTORNEY

Patented Dec. 6, 1949

2,490,377

UNITED STATES PATENT OFFICE 2,490,377

SYSTEM FOR DETERMINING THE POINT OF BREAK IN AN ELECTRICAL CONDUCTOR

William R. MacLean, Brooklyn, N. Y., assignor to Universal Electronic Laboratories, Inc., New York, N. Y., a corporation of New York Application December 16, 1944, Serial No. 568,489

4 Claims. (Cl. 175—183)

My invention relates to novel systems for, and methods of determining the distance to a break in an electrical conductor, and more particularly relates to a novel system for measuring the capacity of a conductor.

Among the problems that arise in the maintenance of telephone equipment is the repair of damaged wires. Before such damage can be repaired, it must be located. In practice it is found advantageous to determine the approximate position of the fault on a telephone line by electrical measurements at its terminals before sending personnel to repair it. Damages may take the form of shorts between the two wires of a pair, crosses between the wires of adjacent pairs, grounds or open circuits. The first three kinds of these faults can and have been located by conventional bridge methods using direct current, the bridge arms being purely resistances.

The present invention is concerned principally with the location of open circuited telephone wires. In this case it is not feasible to use simple direct current.

The distance to such breaks in the telephone line is determined by measuring the apparent capacity at the terminal of a pair of wires. Knowing this measured capacity and knowing the distributed capacity coefficient of the wire, that is, its capacity in microfarads per mile, it is then possible to determine the distance to the break by simple proportion. There is, however, one complicating spurious phenomenon, namely, the fact that the wires have resistance.

Due to this resistance the impedance measured at the terminals is not a pure capacity, but rather a complex impedance with a resistive component of more or less importance. Due to this resistance it so happen that the apparent capacity does not increase indefinitely with the length of the line but rather approaches a finite limit when the lines become infinitely long. Nevertheless the apparent capacity increases proportionately to the length for length of line up to a certain value. The length at which the proportionality fails to hold depends upon the capacity per mile, the resistance per mile, and the frequency at which the measurement is made.

In general, this length will be longer if the frequency is lower. Because of this fact it is customary in the telephone plant to make measurements at four cycles per second. To make these measurements at such a low frequency requires the use of rather complicated and extensive equipment. Also to obtain such a measurement by the use of a conventional bridge, it is necessary to have the feature known as a double balance. The bridge must be balanced for both the capacitive and resistive component.

As a result it is not possible to secure a reading quickly but it is necessary to alternate between capacitive and resistive balances until a sufficiently accurate balance is obtained. Such a procedure is not objectionable when measurements are made under the conditions which obtain in telephone terminal installations where equipment and facilities and trained personnel are available.

A similar but more difficult problem exists in making the same measurements on military telephones under combat conditions. To do this it is highly desirable to have a small, light, portable measuring set which can be operated quickly by personnel not particularly well trained. The equipment for measuring at the low frequency of four cycles per second would not be suitable for this purpose.

It is considered that a frequency of perhaps 20 cycles is as low as can conveniently be handled; but more important it is desirable to avoid the necessity of the double balance. For field work and with unskilled operators it is practically essential to have an instrument which reads the capacity independently of the resistance and gives a reading immediately without the necessity for multiple adjustments.

If a bridge of the slide-wire type is employed in which a resistance slide-wire is the sole adjustment and the third arm is a pure capacity and the fourth arm is the unknown consisting of a condenser and resistor in parallel, it is possible to approximate this desired condition. The conditions necessary for this to be true are that the detector be placed across the slide-wire, the generator across the conjugate arm; that the reactance of the standard and the unknown be large compared with the resistance of the slide wire and that a detector be used which indicates zero when the phase between the oscillator and the detector voltages is 0°. It can then be shown by mathematical analysis (vector diagrams) that the unknown capacity actually used is approximately the same as the pure capacity that would be necessary for balance providing that the power factor of the original unknown is not too high.

This means that if such a bridge is calibrated with the standard slide-wire calibration as would be used for a bridge measuring a pure capacitive unknown by means of a pure capacity standard, the readings on this calibration will still be approximately correct even though the unknown is shunted by a resistance providing this resistance is not to small.

It is seen that this bridge circuit measures the capacity of the unknown when it is considered as being a capacity and conductance in parallel, say $C_p$ and $G_p$, respectively. In the past it has been usual to measure the unknown as a capacity and resistance in series, say $C_s$ and $R_s$. The impedances of either combination is the same but $C_s$ and $C_p$ are not equal. The use of either to determine the length of a broken line leads to some error.

Mathematically it appears that to measure the series capacitance of the line introduces a smaller degree of error than would be obtained with apparatus measuring the parallel capacitance.

I have discovered, however, that while theoretically the measurement of the parallel capacitance may be less accurate, in practice the bridge and other equipment for this measurement is relatively simple, introduces only a negligible error, and is satisfactorily operable by inexperienced operators.

Accordingly, the objects of my invention are to provide a novel apparatus and system for measuring the length of a line to a break; to provide a novel system for measuring the capacitance of a line at its terminal; to provide a novel system which enables a one step bridge balance in measuring the capacitance of a line; to provide a novel system for measuring the parallel capacitance of a line at its terminals; and to provide a novel balancing bridge system.

There are other objects of my invention which together with the foregoing will appear in the detailed description which follows in connection with the drawings in which Figure 1 is a conventional capacity bridge for balancing both capacitive and resistive components using a series capacity resistance combination in the standard arm.

Figure 8 is a detailed circuit diagram of one form of my invention.

Figure 1:
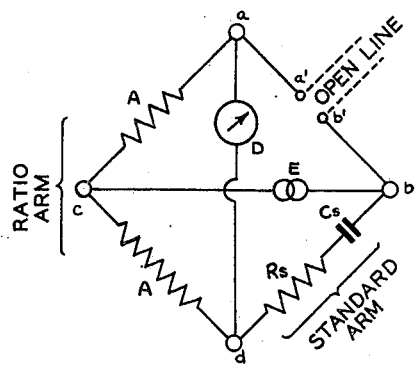

Referring now to the figures, Figure 1 is a drawing of a conventional capacity bridge containing provisions for balancing both capacitive and resistive components of the line under measurement. $a$, $b$, $c$, $d$, are the four corners of the bridge. $a'$, $b'$, are the terminals to which the telephone line, open at its far end, is connected. $A$, $A$ are the ratio arms of the bridge taken equal for simplicity. $E$ is the alternating current source which actuates the bridge. $D$ is the bridge detector which should give an indication of zero current when the bridge is balanced. $C_s$ and $R_s$ are the capacity and resistance, respectively, of the standard arm. Since ratio arms of equal resistance have been used, the bridge will come to balance when $R_s$ and $C_s$ are equal, respectively, to the effective resistance and capacity at the input of the telephone line.

Figure 2:
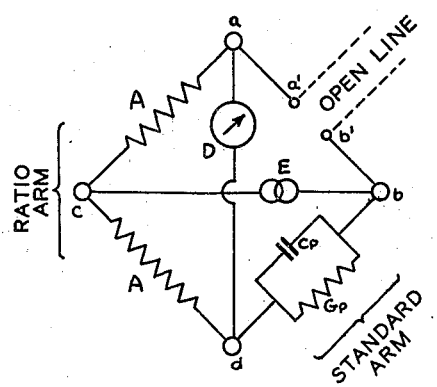
Figure 2 is a variation of the capacity bridge using a parallel capacity resistance combination in the standard arm.

Figure 2 is another variation of the capacity bridge which differs from Figure 1 only in the standard arm. In this latter case a parallel combination rather than a series combination is employed. In particular the new standard arm consists of a capacity $C_p$ shunted by a leak of conductance $G_p$. By adjusting $G_p$ and $C_p$ this bridge also may be brought to balance and in that case $C_p$ and $G_p$ may be regarded as equal to the effective capacity and conductance at the input of the telephone line.

For a short telephone line, it turns out that $C_s$ and $C_p$ are practically equal. For a longer line, however, they are no longer equal. Since, however, the bridge is balanced in both cases the impedances of the two standard arms may be regarded as equal to each other. This is not a contradiction since it is known that at a single frequency an impedance with a negative phase angle may be represented by a condenser and resistor in series or equally well by a condenser and conductance in parallel although the values needed for the two equivalents are different. Hence, when speaking of the effective capacity measured at the input terminals of a telephone line open at the far end, it is necessary to distinguish between these two cases. Accordingly $C_s$, the reading of the bridge of Figure 1, is referred to as the apparent series capacity, and $C_p$, the reading of the bridge of Figure 2, is referred to as the apparent parallel capacity. Neither of these is exactly equal to the true capacity of the line $CS$, where $C$ is the capacity coefficient in microfarads per mile, and $S$ is the length of the line in miles.

For a given frequency however, there exists a definite relationship between $C_s$ and $C_p$ which can be determined by simple mathematical analysis.

If $w$ is the radian frequency of the generator, i. e. $w=2\pi f$, and if $j=\sqrt{-1}$, then the impedance $Z$ of the series combination in the standard arm of Figure 1 is simply:

(1) $$Z=R_s+\frac{1}{jwC_s}$$

On the other hand, the admittance $Y$ of the parallel combination in the standard arm of Figure 2 is:

(2) $$Y=G_p+jwC_p$$

If the bridge is balanced in both cases, then the impedance of both standard arms is alike since both are balanced to the same line, hence (3) $$Z=\frac{1}{Y}$$

Inserting the values for $Z$ and $Y$ from (1) and (2) in (3) it becomes:

(4) $$R_s+\frac{1}{jwC_s}=\frac{1}{G_p+jwC_p}$$

On the left, mutiplying the top and bottom of the fraction by $j$, and on the right multiplying top and bottom by the conjugate of the bottom:

$$R_s-j\frac{1}{wC_s}=\frac{G_p-jwC_p}{(G_p+jwC_p)(G_p-jwC_p)}$$

Multiply out the bottom of the right hand side:

(5) $$R_s-j\frac{1}{wC_s}=\frac{G_p-jwC_p}{G_p^2+(wC_p)^2}$$

Both sides are now split in real and imaginary parts. The imaginary parts may be equated, whence $$-\frac{1}{wC_s}=-\frac{wC_p}{G_p^2+(wC_p)^2}$$

Cancel the minus sign, and multiply both sides by $wC_p$ and get:

$$\frac{C_p}{C_s}=\frac{(wC_p)^2}{G_p^2+(wC_p)^2}$$

Divide top and bottom of the right hand side by $(wC_p)^2$ and get:

$$\frac{C_p}{C_s} = \frac{1}{1+\left(\frac{G_p}{wC_p}\right)^2}$$

Invert $$\frac{C_s}{C_p} = 1+\left(\frac{G_p}{wC_p}\right)^2$$

or (6) $$C_s = C_p\left(1+\left(\frac{G_p}{wC_p}\right)^2\right)$$

This formula (6) expresses the series capacity, i. e. the capacity $C_s$ in Figure 1 needed to balance, in terms of the elements of the parallel connected standard arm of Figure 2. From (6) one finds an important approximate relationship, namely: if the leak $G_p$ is small compared to the susceptance $wC_p$ of the condenser it shunts, then the two capacities $C_s$ and $C_p$ are nearly equal.

By an exactly analogous procedure, but starting from the reciprocal of (3) one can obtain the formula:

(7) $$C_p = C_s\left[\frac{1}{1+\left(\frac{R_s}{1/wC_s}\right)^2}\right]$$

which expresses $C_p$ in terms of the series elements, and shows that if the series resistance $R_s$ is small compared to the reactance of the series condenser $1/wC_s$ then again $C_s$ and $C_p$ are nearly equal.

Finally by equating the real rather than the imaginary part of (5) it can be shown that these two conditions are co-existant; namely, if $R_s$ is small compared to $1/wC_s$ then necessarily in the equivalent parallel circuit $G_p$ is small compared to $wC_p$.

The differences just discussed can be demonstrated by imagining a simple experiment. Assume a telephone line whose length can be increased by adding sections, and assume that this line is tested at its input terminus with the two bridges shown in Figures 1 and 2. When the telephone line is short it would be found that when the bridge is in balance $R_s$ is small compared with $$\frac{1}{wC_s}$$

and also that $G_p$ is small compared with $wC_p$ and hence $C_s$ is approximately equal to $C_p$ as was shown above. Moreover, it would also be found that both $C_p$ and $C_s$ increase proportionately to the length of the line used and that the proportionality constant is the true capacity per mile, C, of the line. Hence for short lines, the length is readily found by this means.

However, as was mentioned above, when the line is sufficiently long the effect of the resistance of the wire is to destroy this proportionality.

It can be determined either experimentally or theoretically that $C_p$ and $C_s$ will always be smaller than the true capacity of the line CS, where S is the length of the line. As a matter of fact it can be shown mathematically that as the length of the line increases without limit, these two quantities $C_p$ and $C_s$ instead of increasing indefinitely, each approach a finite limit. The two limits are different. Now the length of the line where this deviation of the measured capacity from the true capacity becomes noticeable depends upon $w$, R, C, where $w$ is the radian frequency, R is the resistance per mile of the line, and C is the capacity per mile of the line. The length of line up to which the proportionality holds becomes smaller as $w$ and R are made larger. In practice, no immediate control can be exercised over the value of R, the resistance of the line per mile. On the other hand, the value of the frequency within limits can be controlled. In actual telephone practice, where these measurements are made from a terminal station located in a building, it has been customary to use a frequency as low as 4 cycles per second.

If S is the length of the line, then the true total capacity as has been mentioned before is CS. $C_p$ and $C_s$ are smaller. The difference between the true total capacity and $C_s$ is called the hyperbolic error. It is more correctly expressed as the hyperbolic error for the equivalent series capacity. The difference between the true total capacity and $C_p$ should then be called the hyperbolic error of the equivalent parallel capacity.

In the actual application of such measurements to locate an open circuit in the telephone line, it is conceivable possibly to make a correction to eliminate this hyperbolic error in either case. However, it is usually more satisfactory to choose a frequency so low that the error is negligible. To effect a negligible error, it is first necessary to determine the magnitude of the two hyperbolic errors.

It is well known that the series error is the smaller and for this reason it has been customary to use bridge circuits to measure $C_s$. However, no satisfactory single balance portable bridge has been developed to measure this quantity. I have discovered that the measurement of $C_p$ is still satisfactory for determining the length of a broken telephone line under field conditions in spite of its larger hyperbolic error and have invented the present single balance portable bridge for measuring $C_p$.

In the two bridges shown in Figures 1 and 2, the equivalent series resistance $R_s$, or the equivalent parallel conductance $G_p$, are measured simultaneously with the equivalent series capacity $C_s$, or the equivalent shunt capacity $C_p$. This co-determination of either resistance or conductance is really extraneous since it is not used in determining the distance to the break in the wire. Nevertheless, in bridges of the type shown in Figures 1 and 2, it is necessary to balance this resistance or conductance in order to measure the capacity at all, since if this is not done the bridge will not come to balance; that is, the detector D cannot be made to indicate null by an adjustment of the capacity alone.

In actual operation it would be necessary with this type of bridge to adjust the capacity until the detector (D) reads a minimum, then to adjust the resistance or the conductance until the detector reads an even smaller minimum. It is therefore necessary in this type of bridge to adjust first the capacity and then the resistance and then the capacity and then the resistance, etc. Theoretically it is necessary to repeat this process ad infinitum. However, in practice, after a certain number of adjustments the minimum obtained has fallen to the limit of sensitivity of the detector D, after which no further adjustments are purposeful.

Since, as was mentioned above, the hyperbolic error for $C_s$ is the smaller, bridges of the type of Figure 1 have usually been used for finding the length of a broken telephone line. When such a bridge is operated at a frequency of 4 cycles per second, which low frequency is chosen to make the hyperbolic error small, it is found that the sensitivity of the detector is a limiting factor. To increase this sensitivity, a special type of detector called a dynamometer galvanometer is sometimes used.

Figure 3:
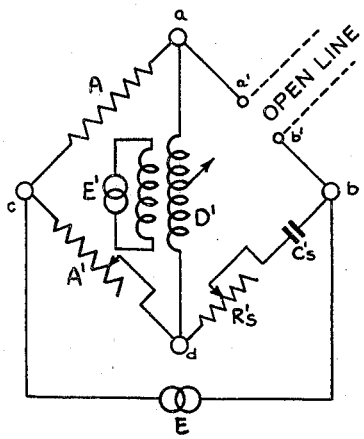
Figure 3 is a modified bridge using unequal ratio arms.

A circuit employing such a detector is shown in Figure 3. Figure 3 differs from Figure 1 in several respects. In Figure 3 the two ratio arms are not equal but different and it is indicated that the arm A' is variable. In this circuit the arm A' instead of the standard condenser in the bridge is varied. This is done because it is somewhat inconvenient to vary a large capacity. In the circuit of Figure 3 the standard arm consists of a resistance $R_s'$ in series with a condenser $C_s'$. When this bridge is balanced, $C_s'$ is not equal to the equivalent series capacity $C_s$ of the open telephone line since the ratio arms are not equal. By applying the well known bridge proportion, the equivalent series capacity $C_s$ is given by the formula $$(8) \qquad C_s = C_s' \frac{A'}{A}$$

when the bridge is balanced.

In Figure 3, E is the voltage driving the bridge. E' is a second voltage of the same frequency as E but differing from E by a predetermined phase angle. The dynamometer detector D' gives a deflection which is proportional to the product of the currents in the two coils multiplied by the cosine of the phase angle between these two currents.

It will now be seen that the deflection obtained when the bridge is out of balance depends upon the phase angle of the voltage E' with respect to voltage E. If the unbalance of the bridge is due to a misadjustment in $R_s'$, the phase of the current through the detector will not be the same as if the unbalance is due to a misadjustment of the variable ratio arm A'. Hence it is advantageous from the point of view of sensitivity to vary the phase of E' when manipulating $R_s'$ and A', using in each of the two cases a phase of E' giving the maximum sensitivity.

The methods described so far are those used and particularly applicable to the determination of the distance to a break in a telephone line when these measurements are made by experienced personnel with elaborate equipment located within the protection of a building. For certain purposes, particularly military purposes, it is necessary to have a testing set which is small and readily portable and which can be operated by relatively inexperienced personnel and still will perform a similar function with a reasonable degree of accuracy. In such a portable set it is not feasible or necessary to use the very low frequency of 4 cycles per second. This low frequency was used, it will be remembered, in order to make the hyperbolic error as small as possible so that it could be disregarded. Since the hyperbolic error will always be small when the line is short enough, this is the same as saying that 4 cycles per second is used to make the range of the measuring equipment as great as possible. By range is understood that length of line which can be measured without taking into consideration the hyperbolic error. In a portable field set, particularly for military purposes, it is not necessary to attain such a long range or such a degree of accuracy. As a first step in this direction a frequency of approximately 20 cycles is chosen as being one low enough for the purposes but still easily managed in portable equipment.

It will be remembered that in the circuits of Figure 1 or Figure 3 a balancing procedure was necessary which involved the alternate manipulation of two adjustable elements. This procedure is known as a double balance. In a portable set to be operated by personnel not fully trained in electrical phenomenon and to be used under field conditions, it is highly desirable that this double balance be avoided. As was mentioned previously, the co-determination of the resistance is not in itself necessary. It is therefore desirable to employ a type of bridge which would indicate with one single balancing adjustment the capacity alone of the line being tested.

As was observed previously, the equivalent series capacity $C_s$ of a telephone line has a smaller hyperbolic error than the equivalent parallel capacity $C_p$. Hence the obvious procedure is to employ such a bridge modified to give $C_s$ directly and with one adjustment. Such attempts have been made but have not been completely successful. One circuit which has been evolved for this purpose has proven in practice to be unreliable and inaccurate.

Although the hyperbolic error of the parallel capacity $C_p$ is larger than that of the series capacity $C_s$, I have discovered that even this larger error can under some circumstances be made negligible compared with the accuracy of a portable equipment. I have discovered that measuring the parallel capacity $C_p$ can be accomplished with apparatus which is simple, requires a minimum of adjustment in production, is reliable, and can be operated with the least amount of operator skill.

My present invention consists primarily of such a bridge for the measurement of the equivalent parallel capacity of a telephone line open circuited at the far end.

Figure 4:
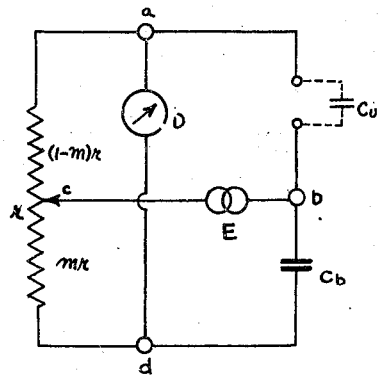
Figure 4 is a conventional slide-wire bridge in the measurement of pure capacities.

Before describing the principles upon which this bridge operates, it is useful to describe the operation of a conventional slide-wire bridge for the measurement of pure capacities, i. e., those without series resistance or leakage. Such a bridge is shown in Figure 4, a, b, c, and d are the four corners of the bridge. The two purely resistive ratio arms are the two portions of a slide-wire on either side of the sliding contact which is represented in the figure by the arrowhead at c. E is the driving voltage and D is the detector. $C_b$ is the standard condenser of the bridge and $C_u$ is the unknown capacity to be measured. The total resistance of the slide-wire is $r$. The dial of the slide-wire is ordinarily first marked with an auxiliary scale running from zero to 1, regardless of the value of the total resistance of the slide-wire. With the slider in any position the reading on this graduation will be designated by $m$. In Figure 4, $m$ is 0 at the bottom of the resistor and equal to 1 at the top. By applying the well known bridge proportion, the unknown capacity $C_u$ is given by the formula $$(9) \qquad C_u = \frac{m}{1-m} C_b$$

In the actual application of the bridge of Figure 4, it would be possible by the use of the scale $m$ to determine the unknown capacity by the application of this formula. It would also be possible to determine $C_u$ by the use of a calibration curve depicting this formula, i. e. giving relation between $C_u$ and $m$. However, in accordance with my invention it is much more convenient to mark the slide-wire dial directly with the values of $C_u$ which can readily be done.

The basic idea of this invention consists in the observation that it is possible to use a circuit quite similar to Figure 4 that will give by the same formula the approximately correct value for the unknown capacity even though it is shunted with a conductance. The changes necessary to accomplish this consist only in the proper proportioning of the elements of the bridge and in the use of a phase selective detector.

Figure 5:
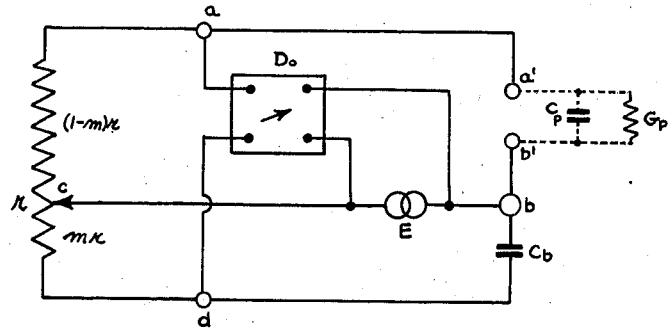
Figure 5 is a bridge embodying one form of my invention.

An embodiment of the principle of this invention is shown in Figure 5 which differs from Figure 4 only in the arrangement of the detector and in the fact that it is now permitted to have a conductance in parallel with the unknown capacity. The detector $D_0$ in the circuit of Figure 5 could in principle be a dynamometer galvanometer as described above, together with certain phase controlling networks. However, such a dynamometer galvanometer would not be very practical for portable equipment. Hence in practice, $D_0$ consists of other means of accomplishing the same purpose. These means will be described later. Functionally $D_0$ is an indicator which shows null when the voltage across the detector terminals $a$—$d$ is essentially in phase with the voltage of the generator $E$, or when the voltage across the terminals $a$—$d$ is zero. In Figure 5 the combination $C_p$ and $G_p$ simulate the telephone line under test.

Figure 6:
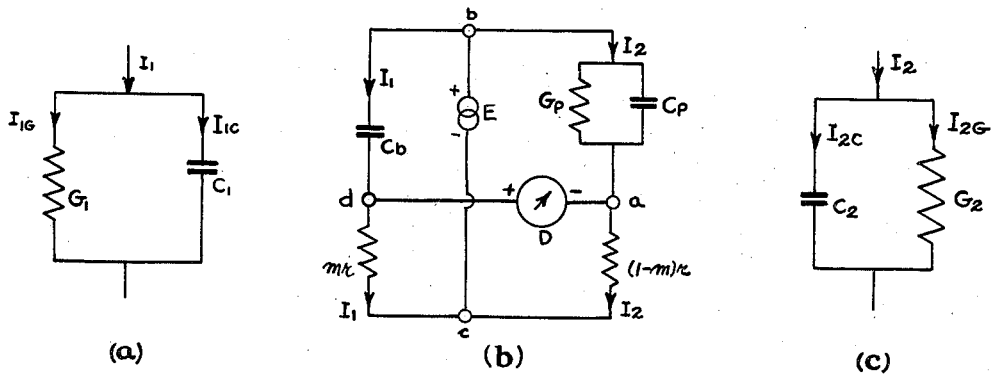
Figure 6 is a re-draft of Figure 5 for purposes of analysis.

To explain the theory of operation of the circuit of Figure 5, which is the essential part of this invention, it is best first to re-draw it as shown in Figure 6b. In this figure the voltage, as an alternating current vector, across D, will be determined theoretically, from which determination it is possible to infer the conditions under which balance is indicated on the phase selective detector $D_0$ of Figure 5.

Figure 7:
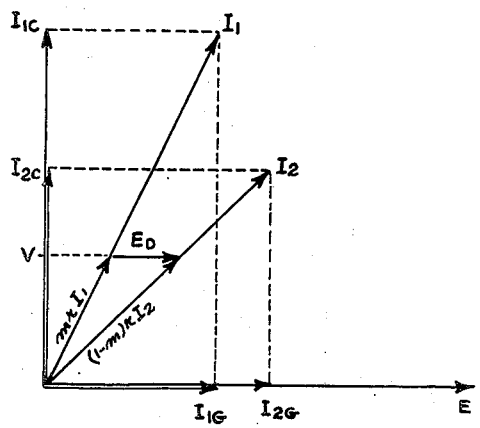
Figure 7 is a vector diagram of the voltages and currents obtained in my novel circuit.

To analyze the circuit of Figure 6b it is first assumed that detector D has an infinite impedence, that is, draws no current. In other words, open circuit voltage is available across the detector arm $a$—$d$ of the bridge. For this purpose reference is made to the vector diagram of Figure 7. In this latter figure the vector E represents the generator voltage in phase and magnitude. It is taken as the reference phase. Since detector D of Figure 6b draws no current, the current $I_1$ shown on the left, flows through $C_b$ (the standard condenser) and the resistance $mr$ without alteration. Since this combination represents a capacitive impedance, the current $I_1$ will lead the voltage E, as shown in Figure 7. On the right of Figure 6b the current $I_2$ similarly flows through the $G_p$—$C_p$ combination (which represents the telephone line under test) and thence through the resistance $(1-m)r$. This current also leads the voltage E as shown in Figure 7.

The left hand combination $C_b$ with $mr$ of Figure 6b, being a capacitive impedance, can be represented as the parallel combination of a condenser and conductance as previously demonstrated. Figure 6a is this combination. It has the same impedance as $C_b$ and $mr$ is series, and hence would draw the same current $I_1$ if connected in place of the left hand side of Figure 6b between the bridge corners $b$ and $c$. But in Figure 6a the current $I_1$ is split into two parts, $I_{1G}$ and $I_{1C}$, namely that flowing through the conductance $G_1$ and that flowing through $C_1$. $I_{1G}$ is in phase with E, since E is the voltage across $G_1$. Then $I_{1C}$ leads E by 90° since E is the voltage across $C_1$. These two components are shown in Figure 7 and it is also shown how $I_1$ is their vector sum.

The right hand combination of Figure 6b consisting of $C_p$, $G_p$ and the resistance $(1-m)r$ connected as shown, can also be represented as a simple parallel circuit as shown in Figure 6c. By means of this circuit one splits the current $I_2$ into the two components $I_{2G}$ and $I_{2C}$ flowing through $C_2$ and $G_2$. These components also are respectively in-phase and in quadrature with E as shown in Figure 7. They are there shown combined to form the total $I_2$.

It is to be understood that the conductances $G_1$ and $G_2$ and the capacities $C_1$ and $C_2$ do not physically exist but are merely introduced as concepts to facilitate the analysis.

Since the current $I_2$ flows through the resistance $(1-m)r$ on the right hand side of Figure 6b, it follows that the voltage drop across this resistor is $(1-m)rI_2$. This means also that this drop is in-phase with $I_2$. This is shown in Figure 7. Similarly the drop across the resistor $mr$ is in-phase with $I_1$ and equal to $mrI_1$. This also is shown in Figure 7.

Now if the two vectors $(1-m)rI_2$ and $mrI_1$ shown in Figure 7 represent the drops across the two resistors, $(1-m)r$ and $mr$, then the difference between them will be the detector voltage $E_D$ as shown in Figure 7 and Figure 6b.

If in the circuit of Figure 5 which is the basic circuit of this invention, the detector $D_0$ indicates null when the detector voltage is in-phase with the generator voltage E, this would correspond in Figure 7 to the condition that the vector $E_D$ was parallel to E; i. e., horizontal in the drawing. In this case the vector $E_D$ has no vertical component, or in other words, the vertical components of the two vectors $mrI_1$ and $(1-m)rI_2$, representing the drops across $mr$ and $(1-m)r$ are equal. These equal vertical components are designated in Figure 7 by V.

Now, the vertical or quadrature component of the drop across the resistor $mr$ is merely the value $mr$ multiplied by the quadrature component of $I_1$, namely $I_{1C}$. Hence the euqation:

(10) $$V = mrI_{1C}$$

Correspondingly, the drop across $(1-m)r$ when the detector of Figure 5 reads null, i. e., when the detector voltage is in phase with the generator voltage, is given by the equation:

(11) $$V = (1-m)rI_{2C}$$

From the last two equations:

(12) $$mrI_{1C} = (1-m)rI_{2C}$$

But now the two hypothetical condensers $C_1$ and $C_2$ have the voltage E directly across their terminals, consequently the currents through them are given by E multiplied by their respective susceptances, i. e.:

(13) $$I_{1C} = jwC_1E$$
$$I_{2C} = jwC_2E$$

Putting (13) into (12):

(14) $$mrjwC_1E = (1-m)rjwC_2E$$

Cancelling $r, j, w$, and E:

(15) $$mC_1 = (1-m)C_2$$

Or simply:

(16) $$C_2 = \frac{m}{1-m}C_1$$

This formula is seen to be exactly the same as Equation 9 which relates the value of the unknown capacity $C_u$ to the standard capacity $C_b$ in the pure capacity slide-wire bridge of Figure 4.

The essential observation which leads to the present invention is that under circumstances, $C_1$ of Figure 6a may be substantially equal to $C_b$ of Figure 6b and that $C_2$ of Figure 6c may be substantially equal to $C_p$ of Figure 6b. If this is so, then $C_b$ may be substituted for $C_1$ in (16) and $C_p$ may be substituted for $C_2$ therein, which would give the same formula as that of a pure capacity bridge but would none the less read the value of the parallel component of capacity of a telephone line in the presence of the equivalent shunt conductance $G_p$ due to the resistance of the telephone wires, and would accomplish this with only a single balance. Hence, starting with a slide-wire bridge carrying the proper dial markings to read directly as a pure capacity bridge such as Figure 4, it is simply necessary to introduce a zero phase detector as shown in Figure 5 into the circuit of Figure 4 to obtain a bridge that reads $C_p$ approximately in the presence of $G_p$ providing that certain circumstances obtain.

The circumstances needed to have this approximation hold have been shown above in the formulae (6) and (7). According to these formulae, if the resistance $mr$ is small compared to the reactance of the bridge standard $1/wC_b$, then in the equivalent circuit of Figure 6a, $C_1$ will nearly equal $C_b$. This will be true for all $m$ if $1/wC_b$ is small compared to $r$, the total slide wire resistance. By the same formulae, if in Figure 6b, $G_p$ is small compared to $wC_p$ and if also $(1-m)r$ is small compared to $1/wC_p$, then $C_2$ will nearly equal $C_p$. Under these circumstances the equation may now be written:

(17) $$C_p \approx \frac{m}{1-m} C_b$$

This indicates that within the accuracy of the approximation the markings of a pure capacity bridge may be employed to read $C_p$ in the circuit of Figure 5.

The requirement that $(1-m)r$ be small compared to $1/wC_p$ will automatically be satisfied at or near balance if the first condition that $r$ be small compared to $1/wC_p$ is satisfied. This is seen from (17) by re-arranging it as:

(18) $$\frac{(1-m)r}{1/wC_p} \approx \frac{mr}{1/wC_b}$$

The condition that $G_p$ be small compared to $wC_p$ merely means that the telephone line under test, that is, simulated by the parallel combination of $G_p$ and $C_p$ be not too long. If one designates by $\Delta$ the ratio of $G_p$ to $wC_p$:

(19) $$\Delta = \frac{G_p}{wC_p}$$

which may be called the "dissipation factor" of the line, then the above just means that $\Delta$ shall not be too large. This is quite satisfactory since as the dissipation factor, $\Delta$ begins to grow with the length of the line; so does the hyperbolic error, and it is intended to restrict the application to lengths of line for which the hyperbolic error is small.

To justify further the substitution of $C_b$ for $C_1$ and $C_p$ for $C_2$ in (16) to obtain (17), the error involved may be computed. By the use of the formulae (6) and (7) the following two relations are obtained:

(20) $$\frac{C_1}{C_b} = \frac{1}{1+m^2r^2w^2C_b^2}$$

by (7) and then:

(21) $$\frac{C_2}{C_p} = \frac{1}{(1+(1-m)rG_p)^2 + (1-m)^2r^2w^2C_p^2}$$

In the last, both formulae (6) and (7) are used.

To complete the evaluation of the error, the quantity $C_0$ is defined by the formula:

(22) $$C_0 = \frac{m}{1-m} C_b$$

which quantity by (17) is supposed to be nearly equal to $C_p$. $C_0$ would be the actual markings on the dial of the bridge. The difference $C_p - C_0$ would be the actual correction and the ratio of this to $C_0$ the fractional correction.

By using (20) and (21) in (16) and invoking (22), the equation

(23) $$\frac{C_p - C_0}{C_0} = \frac{\frac{r\Delta}{1/wC_0 + 1/wC_b}\left(2 + \frac{r\Delta}{1/wC_0 + 1/wC_b}\right)}{1 + \left(\frac{r}{1/wC_0 + 1/wC_b}\right)^2}$$

is secured in which the correction and not the quantity itself is estimated using the approximation $C_0 \approx C_p$. In (23) the quantity

(24) $$\frac{r}{1/wC_b}$$

is small compared to unity since the bridge is to be so proportioned that this is true. Moreover, $\Delta$ will never be as great as unity, consequently (23) can be simplified by approximation to

(25) $$\frac{C_p - C_0}{C_0} \approx \frac{2r}{1/wC_0 + 1/wC_b}\Delta$$

From (25) it will be noted that the correction becomes small as $C_0$ becomes small, i. e., as the line becomes short. Also the correction cannot exceed $K$ where:

(26) $$K = \frac{2r}{1/wC_b}\Delta$$

It is well to compute this correction for a typical case. Such would be given by the quantities:

(27) $r = 500$ ohms
$w = 2\pi 20$
$C_b = \frac{1}{2}$ $\mu$fd.
$\Delta =$ less than $\frac{1}{4}$ In that case $1/wC_b \approx 16000$, and hence this maximum correction $K$ would be:

(28) $$K < \frac{500}{16000} \cdot 2\frac{1}{4} = \frac{1}{64}$$

The quantity $K$ or $$\frac{C_p - C_0}{C_0}$$

is a correction. Also as can be seen, it is always positive. Hence the reading of the bridge is always too small.

Up to this point it has been assumed that the detector drew no current. While with more elaborate equipment such a condition could be approached, it is desirable in portable equipment to allow the detector to have an impedance approaching the bridge impedance, for in this manner a maximum of sensitivity is secured.

Supposing then that the detector had a purely resistive impedance $R$; the actual voltage across the detector $E'_D$ would differ from the open circuit bridge voltage $E_D$ offered to an infinite impedance detector. Actually $E'_D$ would be given by $$E'_D = E_D \frac{R}{R+Z_B}$$

where $Z_B$ is the impedance looking back into the bridge. As a result, the actual setting of the dial when the detector reads null would be different from the setting for an infinite impedance detector.

Now it can be shown by a mathematical analysis that the error so produced is always smaller than (25) and in the opposite direction. Suppose now that the values tabulated in (27) are used and moreover, a value for $\Delta=0$ and $C_p=\frac{1}{2}$ μfd. is used. The bridge should then balance at $m=.5$ where the other marking $C_0$ would be .5 μfd. It therefore would read exactly. The phase selective detector $D_0$, as will be described below, contains a phase shifting network which can be adjusted. It has been presumed that this is so adjusted that it shows null when the detector and generator voltages are in-phase. Now suppose that this adjustment is so varied that null is indicated for an angle $\theta$ between the detector and generator voltages. This will have no effect on the reading of the bridge when measuring pure capacities, since the detector, though phase selective, always reads null for zero impressed voltage, and in the case of pure capacities, the bridge is truly balanced.

Assume now again that $\theta = 0$. Then if the test capacity $C_p=.5$ μfd. were shunted with a resistor of say 60,000 ohms, creating a dissipation factor $\Delta$ of about 25%, the galvanometer should deflect from zero. When by readjusting the main slide wire a null indication is re-established, the new bridge reading on the scale $C_0$ should be too low by the amount of the error given by (25). Such is the case for $\theta$ precisely equal to zero.

It would appear, however, that by varying the phasing adjustments inherent in the detector so that $\theta$ is not exactly zero, it would be possible to bring the two readings together. This is in fact possible.

When such an adjustment has been made for $C_p=.5$ μfd. and $\Delta=0$ and 25%, the bridge then reads exactly on these two points. One would expect, however, that for $C_p=.5$ μfd. and for values of $\Delta$ lying between 0 and 25% that an error would be observed. This is true, but this error is very much smaller than that indicated by (25).

Moreover, this adjustment of $\theta$ slightly off zero has no effect on the bridge readings for pure capacities no matter what value of $C_p$ is measured. Moreover, it reduces the error for other $C_p$ values with parallel leaks. These facts have been observed experimentally and are expected from general reasoning although a mathematical evaluation of the error has not been undertaken since it is somewhat complicated and apparently unnecessary. It has been determined experimentally that the actual error of the complete instrument described in detail below is almost entirely due to manufacturing irregularities in the standard condenser and in the main slide wire.

A substantially complete and practical embodiment of the invention discussed above is shown in Figure 8. The elements numbered in this figure are tabulated with their values. $T_1$ is an oscillator tube generating a low frequency of about 20 cycles per second. The circuit employed is the type known as a phase shifting oscillator circuit. A capacity-resistance network consisting of the elements 2—1, 18—2, 2—2, 18—1, 3—2, 33, 21—2, 3—1, 18—3 is the phase shifting feedback circuit. By means of this circuit the phase of the voltage appearing at the plate of $T_1$ is shifted 180° and applied to the grid in the same tube.

The filament current for both tubes is supplied by $E_a$ and the plate supply for both tubes is supplied by $E_b$. Resistance 20 and condenser 7 comprise a decoupling network for supplying screen voltage to the oscillator tube $T_1$. The load resistor 21—1 is connected in the plate current of the oscillator tube. A blocking condenser 4 is connected in the circuit leading from the oscillator tube $T_1$ to an amplifier tube $T_2$. The resistance 19 and 18—4 form a dividing network to reduce the voltage before applying it to the grid of the amplifying tube $T_2$ which is the so-called beam power type for operation on a dry cell filament battery.

In the output circuit of tube $T_2$ is a load resistor 13. A blocking condenser 5 in the plate circuit eliminates direct current flow to the transformer 29. The point $c'$ and the positive terminal of the B battery form the terminals of the generator. In other words, the entire circuit described up to this point is represented in the previous diagrams schematically as just a generator. Any other means for obtaining the proper voltage, frequency and wave shape would be equally satisfactory. The oscillator $T_1$ does not generate a perfectly sinusoidal wave. However, by a judicious choice of the amplifier load resistor 13, it is possible to make the distortion of the amplifier compensate to a large extent for the distortion of the oscillator. The wave shape observed between $c'$ and the positive terminal of the B battery is nearly, but not perfectly, sinusoidal. These two points $c'$ and the positive terminal of B battery feed into the generator input terminals $b$—$c$ of the bridge.

The bridge circuit itself consists of the slide wire 12 and the standard condenser 6. The terminals $a'$, $b'$ are the terminals of the instrument. To them are connected the telephone line to be measured. $C_p$ and $G_p$ shown on the diagram simulate the telephone line. All the rest of the circuit is the phase selective detector arrangement.

Instead of the possible dynamometer galvanometer, the phase selective device here employed is the so-called ring modulator 30. It consists of 4 dry rectifiers connected between the four points $u, v, w, x$, as shown in Figure 8. The two resistors 24—1 and 24—2 are equal. The potentiometer 16 located between the two resistors 32—1 and 32—2 is adjusted so that the potentiometer slider is electrically balanced between the points $u$ and $w$. The galvanometer 8 is connected between the points $x$ and $v$.

If now there is applied simultaneously between the terminal pair $u, w$ and between the terminal pair $y, z$ two voltages which are in phase quadrature, the galvanometer 8 will indicate zero current. The entire circuit between the points $c'$ and the terminal pair $u, w$ shifts the phase of the oscillator voltage by 90°; hence the galvanometer 8 indicates zero when the phase of the voltage on the bridge detector terminals $a, d$ is in-phase with the voltage driving the bridge between the terminals $b, c$ or what is the same thing between $c'$ and the positive terminal of the B battery.

This phase shifting network consists of the resistor 14, the condenser 25, the rheostat 15, the condenser 9 and the transformer 29. When the rheostat 15 is properly adjusted an exact 90° shift can be obtained. The transformer enters into and influences the overall phase shift but its primary purpose is to separate electrically one input to the ring modulator from the other, and also to match the impedance of the ring modulator to the amplifier tube T₂ and its load resistor 13.

It will be noted that the phase shifting network is made up of resistors in series and condensers in shunt. It is also possible to shift the phase the other way by using condensers in series and resistors in shunt. However, the latter would form a high pass filter and hence would accentuate the harmonic content of the wave which is not purely sinusoidal to start with. The method actually used forms a low pass filter and eliminates to a large extent these undesirable harmonics before the voltage is applied to the ring modulator. The blocking condenser 5 plays two roles. It prevents any direct current from entering the bridge circuit and also prevents direct current from flowing in the primary of the transformer 29, which direct currents would tend to saturate its core and create distortion. 31 is a so-called variator, i. e., a resistance which changes with current, becoming smaller as the current increases. This is for the purpose of preventing serious overloads on the galvanometer.

The adjustments necessary to put this instrument in operation are the following. The rheostat 33 in the feedback circuit of the oscillator influences the frequency, therefore one first adjusts this rheostat to obtain the desired frequency, in this case approximately 20 cycles. It is next necessary to adjust potentiometer 16 so that the ring modulator is balanced. If there is placed between the terminals $y$ and $z$ in place of the bridge a resistor essentially equal to the resistance of the slide wire 12, the galvanometer 8 should read zero since there is no voltage impressed between these terminals. If it does not the modulator is not balanced. It is therefore necessary to adjust the potentiometer 16 until the galvanometer reads zero when the exciting signal is being applied from the transformer. The bridge should now read pure capacities accurately if the slide wire 12 has previously been calibrated with the formula (9). However, it will not yet read accurately the parallel component of capacity $C_p$ in the presence of a parallel conductance $G_p$.

It is therefore necessary to choose some value of capacity near the middle of the range, say one microfarad, and balance the bridge with this one microfarad connected to the test terminals. In parallel with this condenser, there is placed a conductance of such a magnitude as to create a dissipation factor $\Delta$ of the order of 25%. The galvanometer will then be observed to take up a deflection whereas it is desired that it should remain unmoved. It will be found that the galvanometer can be restored to zero by an adjustment of the rheostat 15 in the phase shifting circuit. When this has been done, the instrument is completely adjusted. It is this simplicity of adjustment and this dependence of the calibration only on the stable impedance elements of the circuit that render this instrument in its application superior to the prior art.

The diagram of Figure 8 is not a complete field testing set. To complete the set it is necessary to add in the diagram there shown provision for using the same calibrated slide-wire 12 for the well known direct current measurements with which this invention is not concerned. For this purpose certain switching arrangements are needed to avoid, insofar as possible, duplicating equipment for the direct current and alternating current circuits. These direct current circuits are well known and standard in the art and need not be described.

The capacity bridge herein described finds an immediate use in the testing of lines. However, it is also useful as a general purpose instrument for the measurement of condensers or any other capacities. In the case of the measurement of a condenser, it is often desired to know the capacity value thereof even though it may not be truly a pure capacity, but may have a certain equivalent parallel conductance.

My invention provides an instrument for determining any capacity even in the presence of a parallel conductance with only a single balance. As such, it can be used as a general purpose capacity bridge.

It will be obvious therefore that my invention may be embodied in many modifications and variations which should now be obvious to those skilled in the art. Accordingly, I prefer to be bound not by the specific disclosures herein but only by the appended claims.

I claim:

1. In a system for determining the point of break in an electrical conductor, a bridge of the resistance slide-wire type in which said resistance slide-wire forms two arms of said bridge, a condenser forming a third arm of said bridge, means for connecting the terminals of the line to be measured for the fourth arm of said bridge, a phase selective detector connected across said slide-wire, a source of alternating current connected between the slider of said slide-wire and the bridge point opposite said slider, the reactance of said condenser at the frequency of said source of alternating current being large compared with the resistance of said slide-wire, circuit connections for polarizing said phase selective detector with an exciting voltage synchronous with and bearing a fixed phase relation with said source of alternating current, said phase relation being such that said phase selective detector gives a null indication whenever the voltage across said slide-wire is either zero or very nearly in phase with said source of alternating current.

2. In a system for determining the point of break in an electrical conductor, a bridge of the resistance slide-wire type in which said resistance slide-wire forms two arms of said bridge, a condenser forming a third arm of said bridge, means for connecting the terminals of the line to be measured for the fourth arm of said bridge, a phase selective detector connected across said slide-wire, a source of alternating current connected between the slider of said slide-wire and the bridge point opposite said slider, the reactance of said condenser at the frequency of said source of alternating current being large compared with the resistance of said slide-wire, circuit connections for polarizing said phase selective detector with an exciting voltage synchronous with and bearing a fixed phase relation with said source of alternating current, said phase relation being such that said phase selective detector gives a null indication whenever the voltage across said slide-wire is either zero or very nearly in phase with said source of alternating current, said slide-wire being calibrated as if said electrical conductor had no resistance.

3. In a system for measuring a capacity possibly lossy, a bridge of the resistance slide-wire type in which said resistance slide-wire forms two arms of said bridge, a condenser forming a third arm of said bridge, means for connecting the capacity to be measured for the fourth arm of said bridge, a phase selective detector connected across said slide-wire, a source of alternating current connected between the slider of said slide-wire and the bridge point opposite said slider, the reactance of said condenser at the frequency of said source of alternating current being large compared with the resistance of said slide-wire, circuit means for poralizing said phase selective detector with an exciting voltage synchronous with and bearing a fixed phase relation with said source of alternating current, said phase relation being such that said phase selective detector gives a null indication whenever the voltage across said slide-wire is either zero or very nearly in phase with said source of alternating current.

4. In a system for measuring a capacity possibly lossy, a bridge of the resistance slide-wire type in which said resistance slide-wire forms two arms of said bridge, a condenser forming a third arm of said bridge, means for connecting the capacity to be measured for the fourth arm of said bridge, a phase selective detector connected across said slide-wire, a source of alternating current connected between the slider of said slide-wire and the bridge point opposite said slider, the reactance of said condenser at the frequency of said source of alternating current being large compared with the resistance of said slide-wire, circuit means for polarizing said phase selective detector with an exciting voltage synchronous with and bearing a fixed phase relation with said source of alternating current, said phase relation being such that said phase selective detector gives a null indication whenever the voltage across said slide-wire is either zero or very nearly in phase with said source of alternating current, said slide-wire being calibrated as if said capacity to be measured were not lossy.

WILLIAM R. MacLEAN.

REFERENCES CITED

The following references are of record in the file of this patent:

UNITED STATES PATENTS

| Number | Name | Date |
|---|---|---|
| 1,665,397 | Wunsch | Apr. 10, 1928 |
| 2,084,678 | Geyger | June 22, 1937 |
| 2,120,391 | Butterfield | June 14, 1938 |
| 2,138,344 | Geyger | Nov. 29, 1938 |
| 2,190,488 | Schnoll | Feb. 13, 1940 |

OTHER REFERENCES

Electronics, Dec. 1943, pages 106–111, 192 and 194.

Hague; Alternating Current Bridge Methods; fourth ed., 1938, Pitman, pages 328–329.